(12) United States Patent
Wooldridge

(10) Patent No.: US 6,634,418 B2
(45) Date of Patent: Oct. 21, 2003

(54) T—STYLE RADIATOR—CHARGE AIR COOLER PACKAGING FOR A MOBILE VEHICLE

(75) Inventor: Scott A. Wooldridge, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/879,305

(22) Filed: Jun. 12, 2001

(65) Prior Publication Data
US 2002/0020365 A1 Feb. 21, 2002

Related U.S. Application Data
(60) Provisional application No. 60/211,132, filed on Jun. 13, 2000.

(51) Int. Cl.[7] .......................... B60K 11/00; B60K 11/04
(52) U.S. Cl. .............................. 165/44; 165/41; 165/67; 180/68.1; 180/68.4; 180/903; 180/123; 180/41.48
(58) Field of Search .............................. 165/41, 42, 43, 165/51, 44, 67; 180/68.4, 68.1, 903; 123/41.48, 41.04, 41.58

(56) References Cited

U.S. PATENT DOCUMENTS

| | | |
|---|---|---|
| 2,806,358 A | 9/1957 | Jacobs |
| 3,621,822 A | 11/1971 | Oster |
| 4,673,032 A | 6/1987 | Hara et al. |
| 4,723,594 A | 2/1988 | Koehr et al. |
| 4,736,727 A | 4/1988 | Williams |
| 4,916,902 A * | 4/1990 | Pratt et al. ................. 165/51 X |
| 4,938,303 A | 7/1990 | Schaal et al. |
| 5,046,554 A | 9/1991 | Iwasaki et al. |
| 5,062,473 A | 11/1991 | Ostrand et al. |
| 5,234,051 A | 8/1993 | Weizenburger et al. |
| 5,267,624 A | 12/1993 | Christensen |
| 5,316,079 A | 5/1994 | Hedeen |
| 5,566,748 A | 10/1996 | Christensen |
| 6,105,660 A | 8/2000 | Knurr |
| 6,129,056 A | 10/2000 | Skeel et al. |
| 6,223,811 B1 | 5/2001 | Kodumudi et al. |

* cited by examiner

Primary Examiner—Ljiljana Ciric
(74) Attorney, Agent, or Firm—Jeffrey P. Calfa; Neil T. Powell; Dennis Kelly Sullivan

(57) ABSTRACT

An radiator and charge-air-cooling package made up of two air cooled heat exchangers: a radiator and a charge-air-cooler, the heat exchangers being attached to one another directly or indirectly and then attachable to a chassis or body of the vehicle. The two heat exchangers are both longer than wide with each having center cooling areas. Each heat exchanger has cooling cores in which their coolant flows. Air passes across these cooling cores when the vehicle moves to cool the coolant. The long sides of each of the heat exchangers are geometrically out of synch with the other. With the center cooling areas of each of the heat exchangers overlapping each other, at least one end of each heat exchanger may be unfettered by air flow the other heat exchanger.

18 Claims, 4 Drawing Sheets

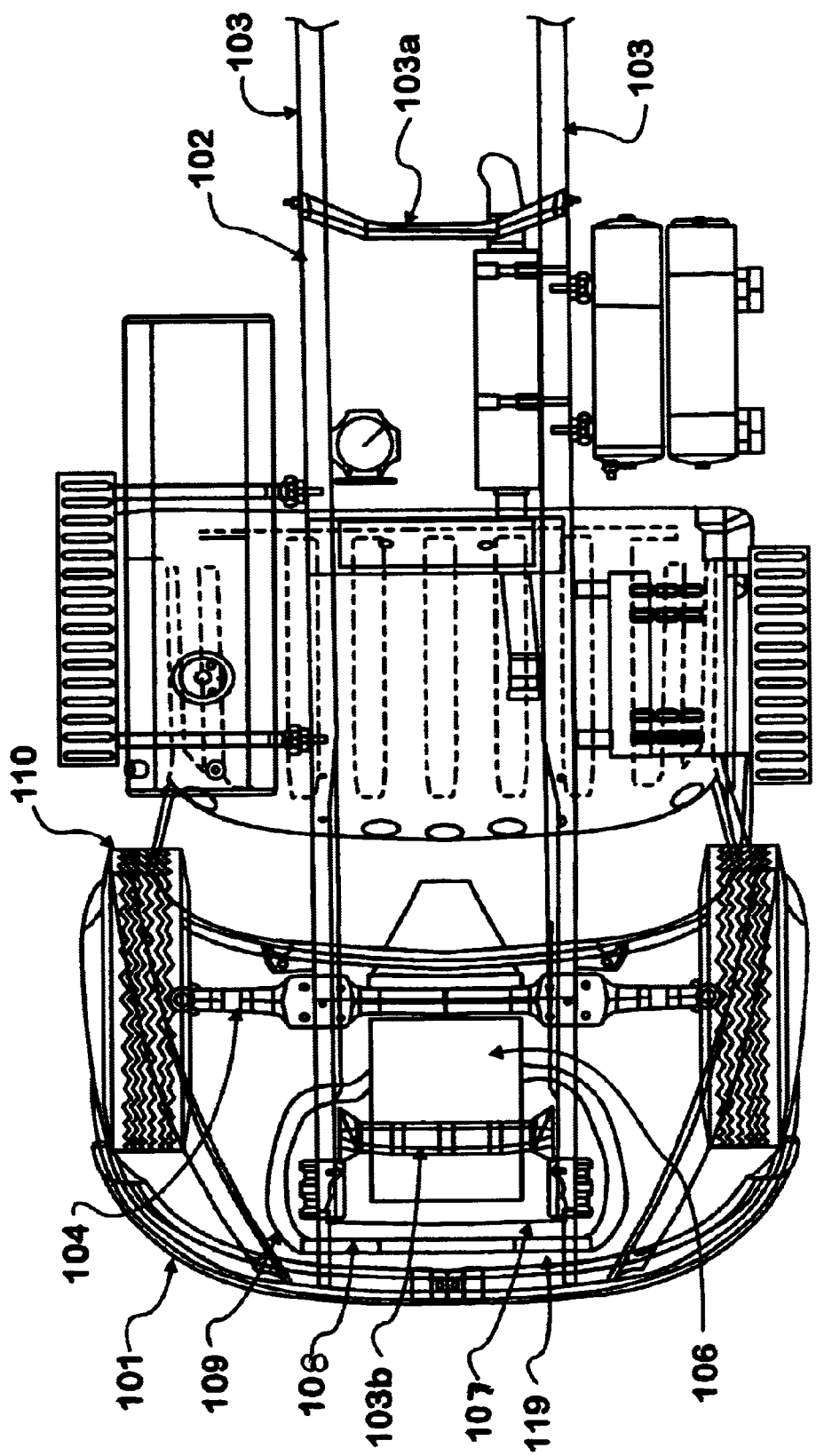

T— STYLE RADIATOR— CHARGE AIR COOLER PACKAGING FOR A MOBILE VEHICLE

This is a non-provisional patent application claiming priority under provisional patent application Serial No. 60/211,132, filed Jun. 13, 2000.

BACKGROUND

This invention relates to packaging of a mobile vehicle radiator and charge air cooling (CAC) for a mobile vehicle chassis. The packaging reduces the amount of frontal or horizontal area required on the front of a vehicle through a novel arrangement of overlapping the radiator and the CAC to allow both heat exchangers to be exposed directly to incoming outside air in areas of highest heat exchange. An existing heat exchanger may be turned 90 degrees and then installed in front or behind the other heat exchanger to form a cross formation such that the inlet and outlet regions of both heat exchangers are exposed directly to outside fresh air with the center of the rearward heat exchanger receiving second hand outside air in the center region.

PRIOR ART

In the prior art, radiators and charge air coolers for mobile vehicles were mounted together in the path of airflow in various configurations. Turbo-charged engines for highway trucks have had cooling of the intake air charge for many years. This usually was accomplished by an intercooler, an intake air-to-engine coolant heat exchanger mounted on the engine, and was quite beneficial in improving engine efficiency and reducing structural loading from cylinder pressure. However, inter-cooling added substantially to the heat rejected to the engine coolant. One arrangement of these components provides the charge air cooler in front of the radiator. In another commercially available embodiment, the charge air cooler is disposed above the condenser and both are in front of the radiator. A significant cooling effect in highway trucks is due to the ram air resulting from high-speed travel. The front heat exchanger would provide better cooling to its internal coolant than the rear heat exchanger due to the closer proximity to the intake grille. The front heat exchanger would essentially starve cooling capacity from the rearward heat exchanger, which receives outside air indirectly through the front heat exchanger. One solution to the prior art involved placement of the radiator and the CAC in parallel, with one above the other as shown in U.S. Pat. No. 4,736,727. This while an effective design increases the size of the overall vertical grille area required on the front of the vehicle. On medium and heavy duty trucks where front visibility is especially important due to the height of the operator cab, the increased grille area decreases the visibility of vehicles directly in front of the vehicle. The driver potentially might not see a short person or child standing directly in front of the vehicle. Without raising the operator cab location, the driver would be able to see less the larger the vertical grille area. Additionally, the popular aerodynamic sleek hood design that drops off at the nose of the vehicle would be hard to design in with larger grille areas. What is needed is a radiator and charge air cooler (CAC) package for a mobile vehicle that provides for improved cooling without one heat exchanger completely starving the other of outside fresh air without increasing front vertical grille area and hence not decreasing driver frontal visibility.

SUMMARY

An object of the invention is hence to provide a radiator and charge air cooler (CAC) package for a mobile vehicle that provides for improved cooling without one heat exchanger completely starving the other of outside fresh air without increasing front vertical grille area and hence not decreasing driver frontal visibility.

The radiator and charge-air-cooling package of this invention and a mobile vehicle with the package installed each satisfy the object of the invention and others not mentioned. The radiator and charge-air-cooling package is comprised generally of two air cooled heat exchangers: a radiator and a charge-air-cooler, the heat exchangers being attached to one another directly or indirectly and then attachable to a chassis or body of the vehicle. The two heat exchangers are both longer than wide with each having center cooling areas. In other words the two heat exchangers are generally rectangular in shape. Each heat exchanger has cooling cores in which their coolant flows. Air passes across these cooling cores when the vehicle moves to cool the coolant. The long sides of each of the heat exchangers are 90 degrees geometrically out of synch with the other. With the center cooling areas of each of the heat exchangers overlapping each other, at least one end of each heat exchanger may be unfettered by air flow the other heat exchanger. In the preferred embodiment, the center cooling areas of each heat exchanger overlap with both ends of each heat exchanger receiving fresh air flow directly from the intake grille. This preferred embodiment may be described as a 'cross packaging or 'T style packaging'. This preferred embodiment of the invention is shown in the attached figures. Analysis has shown that when the air cooled heat exchangers are presented with air flow, the greatest temperature drop or cooling effect is in the end regions, with the center cooling areas being relatively flat as far as temperature drop of the coolant. This invention provides for the end regions of the heat exchangers, where the greatest cooling is found, to be those exposed to the fresh outside air directly. Conversely, the center cooling areas, where the least cooling or temperature drop occurs, are the areas where only the front heat exchanger receives fresh outside air directly is where the overlap of the heat exchangers occur. The result is maximum efficiency for a reduced frontal horizontal surface area. The arrangement may be made with either the radiator or CAC being the front heat exchanger with other being the rear depending on heat load needs.

One method to achieve this design is to use existing radiator and CAC heat exchangers that are each generally rectangular in shape with cooling coils running the longer direction. One of the heat exchangers is reconfigured and turned 90 degrees. The turned heat exchanger is engaged to the second heat exchanger with the center cooling areas overlapping to form the cooling package of this invention. The result is that one heat exchanger has up or down flow through the coils and the other has cross flow from one side of the vehicle to the other when installed.

The cooling package of this invention may be engaged in the vehicle in any location although the embodiment shown is engaged to frame rails of the vehicle chassis.

DRAWINGS

Other objects and advantages of the invention will become more apparent upon perusal of the detailed description thereof and upon inspection of the drawings, in which:

FIG. 1A is a top down view of a portion of a vehicle containing a radiator charge air cooler package made in accordance with another embodiment of this invention.

DETAILS OF INVENTION

Figure 1:
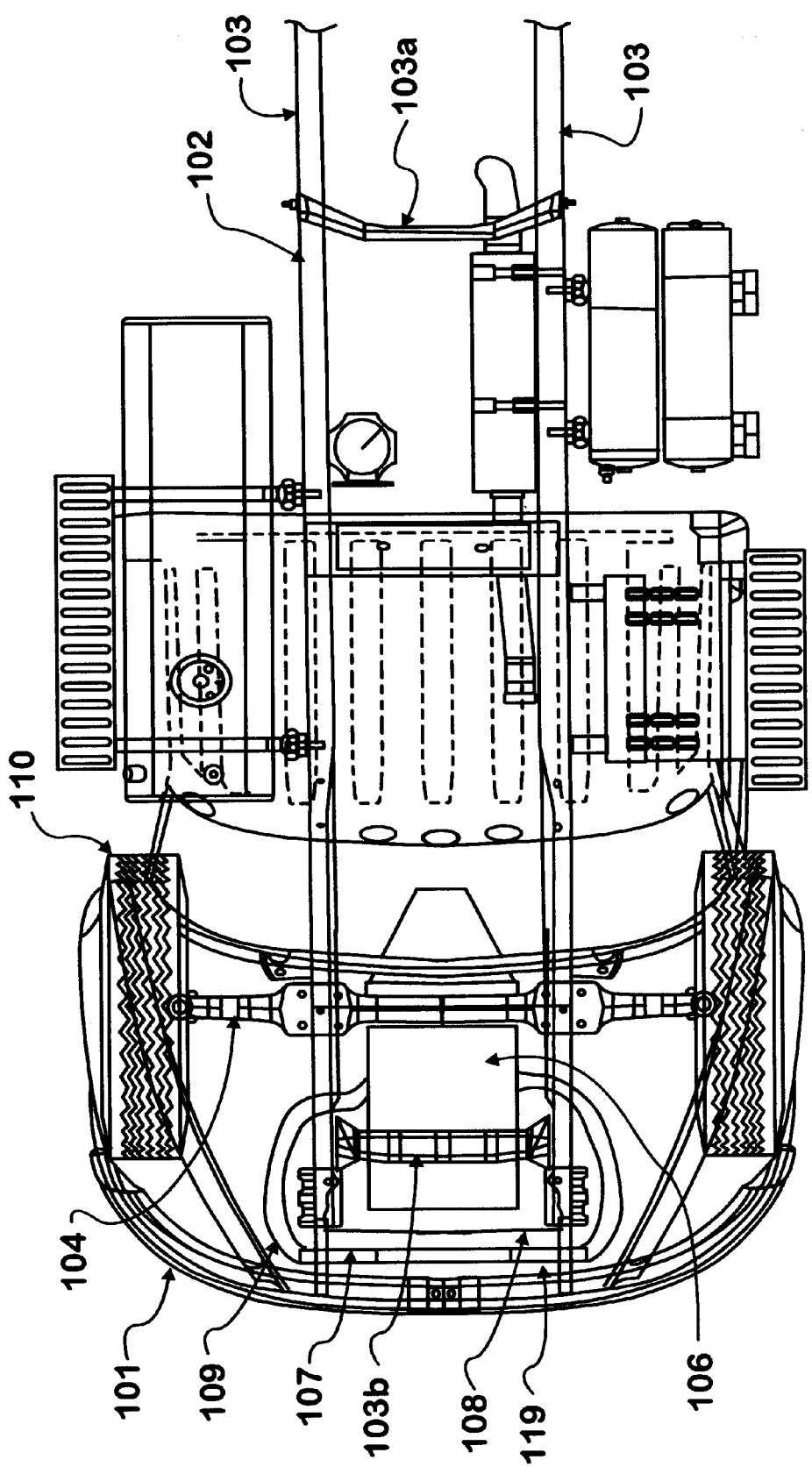
FIG. 1 is a top down view of a portion of a vehicle containing a radiator charge air cooler package made in accordance with this invention.
Figure 2:
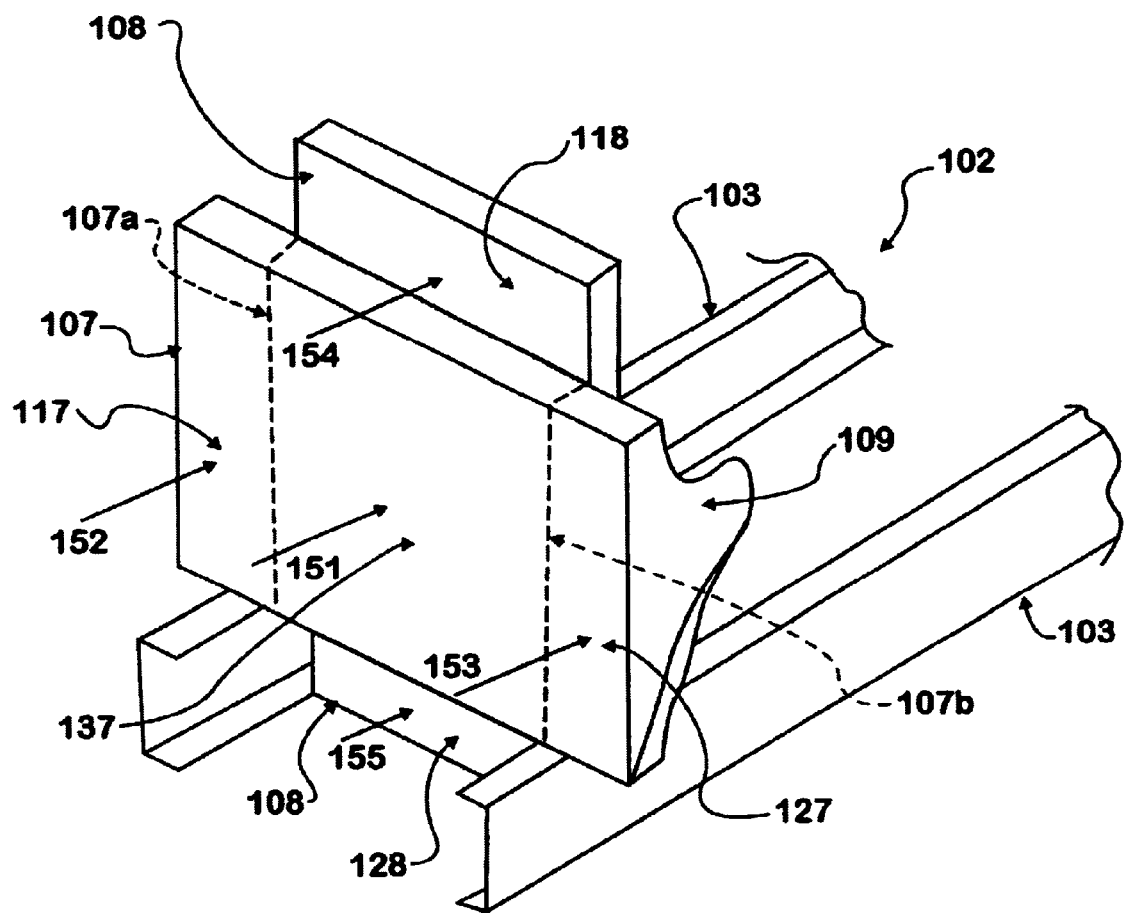
FIG. 2 is perspective view of a portion of the chassis of the vehicle of FIG. 1 showing a radiator and charge-air-cooling package made in accordance with this invention.
Figure 3:
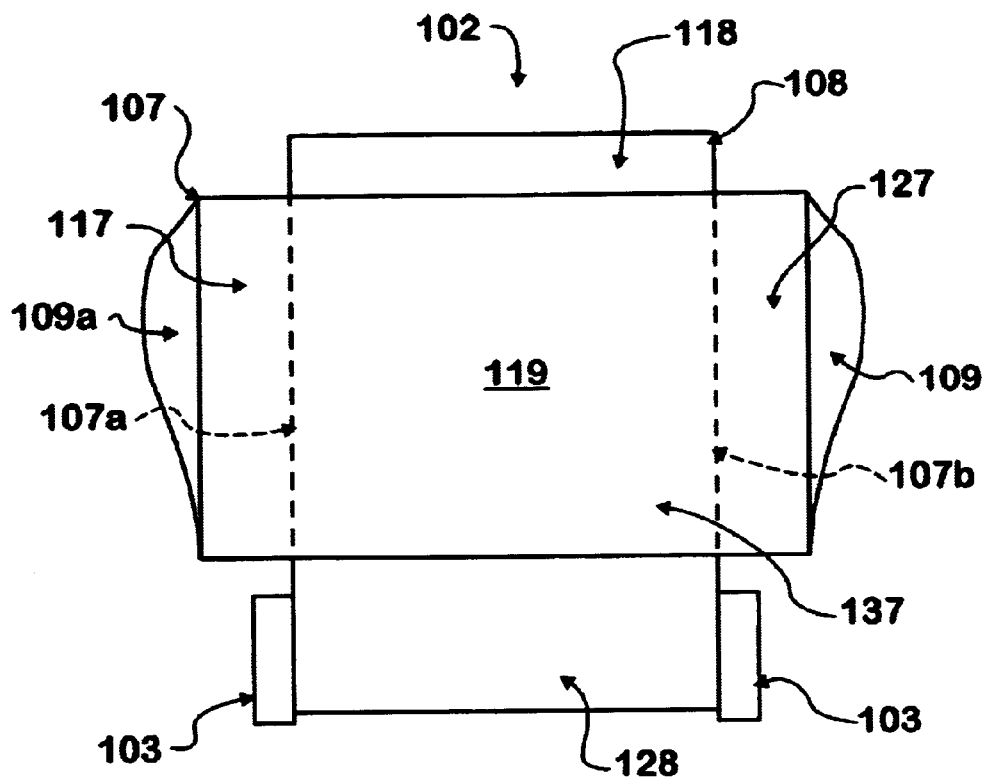
FIG. 3 is front view of the chassis of FIG. 2.
Figure 4:
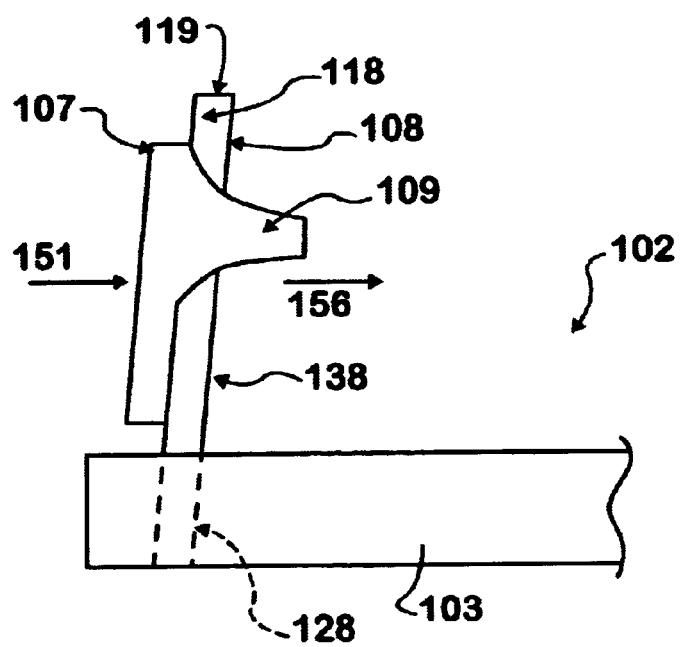
FIG. 4 is a side view of the chassis of FIG. 2.

A portion of a mobile vehicle 101 is shown in FIG. 1. This vehicle includes a chassis 102 and may be a medium-duty or heavy-duty truck or a school or transit bus. A radiator and charge-air-cooling package 119 made in accordance with this invention is shown installed on the chassis 102 in FIGS. 1 to 4. The chassis 102 contains at least two frame rails 103 which are approximately parallel. The frame rails 103 are joined by chassis cross members 103a, and 103b. A front axle and front suspension 104 is engaged to front portion of the frame rails 103. An engine 106 is engaged to the frame rails 103. The charge air cooler package 119 of this invention is comprised of a radiator 107 and a charge air cooler (also referred to here as CAC) 108 engaged to the frame rails 103. The radiator 107 provides cooling to the engine 106 through engine coolant tubing 109. The charge air cooler 108 provides cooling to an engine 106 turbo charger.

The radiator and charge-air-cooling package 119 is comprised generally of two air cooled heat exchangers: a radiator 107 and a charge-air-cooler 108, the heat exchangers being attached to one another directly or indirectly and then attachable to the chassis 102 of the vehicle 101. The two heat exchangers 107 and 108 may be both longer than wide with each having center cooling areas. Both two heat exchangers being generally rectangular in shape would both be longer than wide. Each heat exchanger has cooling cores in which their coolant flows. Air passes across these cooling cores when the vehicle 101 moves to cool the coolant. The long sides of each of the heat exchangers are geometrically out of synch with the other. With the center cooling areas, 137 and 138, of each of the heat exchangers overlapping each other, at least one end of each heat exchanger, 107 and 108, may be unfettered by air flow to the other heat exchanger. These unfettered regions are extensions beyond the overlapped center regions. In the embodiment shown the unfettered air flow for heat exchanger 107 is shown as air flow 152 and 153 to right side extension 117 and left side extension 127, respectively; and the unfettered air flow for heat exchanger 108 is shown as air flow 154 and 155 to upper extension 118 and lower extension 128, respectively. In the preferred embodiment, the center cooling areas, 137 and 138, of each heat exchanger overlap with both ends of each heat exchanger receiving fresh air flow, shown as arrows 152, 153, and 154, and 155, directly from the intake grille. The center region 137 of heat exchanger or radiator 107 is directly in front of the center region 138 or the heat exchanger or CAC 108. The overlap air flow 151 in and 156 out is over the region that has been shown to provide less cooling efficiency. This preferred embodiment may be described as a 'cross packaging or 'T style packaging'. This preferred embodiment of the invention is shown in the attached figures. Analysis has shown that when the air cooled heat exchangers 107 and 108 are presented with air flow 151 to 155, the greatest temperature drop or cooling effect is in the end regions 117, 127, and 118, 128, respectively with the center cooling areas 137 and 138 being relatively flat as far as temperature drop of the coolant. This invention provides for the end regions of the heat exchangers 117, 127, and 118, 128, where the greatest cooling is found, to be those exposed to the fresh outside air directly.

Conversely, the center cooling areas 137 and 138, where the least cooling or temperature drop occurs, are the areas where only the front heat exchanger 107 receives fresh outside air directly is where the overlap of the heat exchangers occur. The result is maximum efficiency for a reduced frontal horizontal surface area. The arrangement may be made with either the radiator 107 or CAC 108 being the front heat exchanger with other being the rear depending on heat load needs.

In the preferred embodiment, the lower extension 128 may be tucked in between the frame rails 103 allowing for an overall lower mounting position. This also allows for a lower overall frontal height of the vehicle hood improving driver visibility and allowing industrial designers more variation in aerodynamic appearance.

One method to achieve this design is to use existing radiator 107 and CAC 108 heat exchangers that are each generally rectangular in shape with cooling coils running the longer direction. One of the heat exchangers is reconfigured and turned 90 degrees. The turned heat exchanger is engaged to the second heat exchanger with the center cooling areas overlapping to form the cooling package of this invention. The result is that one heat exchanger has up or down flow through the coils and the other has cross flow from one side of the vehicle to the other when installed.

The two heat exchanger configuration of this invention is stated as for a mobile vehicle, however one can imagine other two gas or air cooled heat exchangers for non-mobile vehicle purposes being aligned in accordance with this invention. The concept of having a center overlapping region and each heat exchanger, front and back, having at least one extension region for receiving air flow unfettered from the other heat exchanger is applicable in other areas outside automotive.

As described above, the T-style charge air cooler package 119 and a vehicle 101 with this package installed provide a number of advantages, some of which have been described above and others of which are inherent in the invention. Also modifications may be proposed to the T-style charge air cooler package 119 and a vehicle 101 with this package installed without departing from the teachings herein.

I claim:

1. A radiator and charge-air-cooling package for a mobile vehicle, the vehicle having a chassis comprised of two frame rails and cross members and an engine mounted to the chassis, said package comprising:

a front heat exchanger with a center region, a left side extension region, and a right side extension region;

a rear heat exchanger engaged to said front heat exchanger with a center region, an upper extension region, and a lower extension region;

said front heat exchanger and said rear heat exchanger being engageable to said frame rails of the vehicle;

said center region of said front exchanger overlapping in front of said center region of said rear heat exchanger;

said left side extension and said right side extension of said front heat exchanger configured relative to said rear heat exchanger that upon installation on the vehicle said left side extension and said right side extension are exposed to air flow unfettered from air flow across said rear heat exchanger upon vehicle movement, and said upper extension and said lower extension of said rear heat exchanger configured relative to said front heat exchanger that upon installation on the vehicle said upper extension and said lower extension are exposed to air flow unfettered from air flow across said front heat exchanger upon vehicle movement.

2. The radiator and charge-air-cooling package of claim 1, wherein:
said front heat exchanger is a radiator for providing cooling to engine coolant for the engine upon installation on the vehicle; and
said rear heat exchanger is a charge air cooler for cooling an engine turbo charger of the engine upon installation on the vehicle.

3. The radiator and charge-air-cooling package of claim 1, wherein:
said front heat exchanger is a charge air cooler for cooling an engine turbo charger of the engine upon installation on the vehicle; and
said rear heat exchanger is a radiator for providing cooling to engine coolant for the engine upon installation on the vehicle.

4. A radiator and charge-air-cooling package for a mobile vehicle, the vehicle having a chassis comprised of two frame rails and cross members and an engine mounted to the chassis, said package comprising:
a front heat exchanger with a center region, an upper extension region, and a lower extension region;
a rear heat exchanger engaged to said front heat exchanger with a center region, a left side extension region, and a right side extension region;
said front heat exchanger and said rear heat exchanger being engageable to said frame rails of the vehicle;
said center region of said front exchanger overlapping in front of said center region of said rear heat exchanger;
said left side extension and said right side extension of said rear heat exchanger configured relative to said front heat exchanger that upon installation on the vehicle said left side extension and said right side extension are exposed to air flow unfettered from air flow across said front heat exchanger upon vehicle movement; and
said upper extension and said lower extension of said front heat exchanger configured relative to said rear heat exchanger that upon installation on the vehicle said upper extension and said lower extension are exposed to air flow unfettered from air flow across said rear heat exchanger upon vehicle movement.

5. The radiator and charge-air-cooling package of claim 4, wherein:
said front heat exchanger is a radiator for providing cooling to engine coolant for the engine upon installation on the vehicle; and
said rear heat exchanger is a charge air cooler for cooling an engine turbo charger of the engine upon installation on the vehicle.

6. The radiator and charge-air-cooling package of claim 4, wherein:
said front heat exchanger is a charge air cooler for cooling an engine turbo charger of the engine upon installation on the vehicle; and
said rear heat exchanger is a radiator for providing cooling to engine coolant for the engine upon installation on the vehicle.

7. A radiator and charge-air-cooling package in combination with a mobile vehicle, said package comprising:
a chassis;
said chassis comprised of two frame rails and cross members;
an engine mounted to said chassis;
a front heat exchanger with a center region, a left side extension region, and a right side extension region:
a rear heat exchanger engaged to said front heat exchanger with a center region, an upper extension region, and a lower extension region;
said front heat exchanger and said rear heat exchanger engaged to said frame rails of said vehicle;
said center region of said front exchanger overlapping in front of said center region of said rear heat exchanger;
said left side extension and said right side extension of said front heat exchanger configured relative to said rear heat exchanger in that said left side extension and said right side extension are exposed to air flow unfettered from air flow across said rear heat exchanger upon vehicle movement; and
said upper extension and said lower extension of said rear heat exchanger configured relative to said front heat exchanger in that said upper extension and said lower extension are exposed to air flow unfettered from air flow across said front heat exchanger upon vehicle movement.

8. The cooling package and vehicle combination of claim 7, wherein said front heat exchanger and said rear exchanger are both rectangular in shape when viewed from the front.

9. The cooling package and vehicle combination of claim 8, wherein:
said front heat exchanger is a radiator for providing cooling to engine coolant for the engine upon installation on the vehicle; and
said rear heat exchanger is a charge air cooler for cooling an engine turbo charger of the engine upon installation on the vehicle.

10. The cooling package and vehicle combination of claim 9, wherein:
said lower extension of said charge air cooler is between said frame rails.

11. The cooling package and vehicle combination of claim 8, wherein:
said front heat exchanger is a charge air cooler for cooling an engine turbo charger of the engine upon installation on the vehicle; and
said rear heat exchanger is a radiator for providing cooling to engine coolant for the engine upon installation on the vehicle.

12. The cooling package and vehicle combination of claim 11, wherein:
said lower extension of said radiator is between said frame rails.

13. A radiator and charge-air-cooling package in combination with a mobile vehicle, said package comprising:
a chassis;
said chassis comprised of two frame rails and cross members;
an engine mounted to said chassis;
a front heat exchanger with a center region, an upper extension region, and a lower extension region,
a rear heat exchanger engaged to said front heat exchanger with a center region, a left side extension region, and a right side extension region;
said front heat exchanger and said rear heat exchanger engaged to said frame rails of said vehicle;
said center region of said front exchanger overlapping in front of said center region of said rear heat exchanger;

said left side extension and said right side extension of said rear heat exchanger configured relative to said front heat exchanger in that said left side extension and said right side extension are exposed to air flow unfettered from air flow across said front heat exchanger upon vehicle movement; and said upper extension and said lower extension of said front heat exchanger configured relative to said rear heat exchanger in that said upper extension and said lower extension are exposed to air flow unfettered from air flow across said rear heat exchanger upon vehicle movement.

14. The cooling package and vehicle combination of claim 13, wherein said front heat exchanger and said rear exchanger are both rectangular in shape when viewed from the front.

15. The cooling package and vehicle combination of claim 14, wherein:

said front heat exchanger is a radiator for providing cooling to engine coolant for the engine upon installation on the vehicle; and said rear heat exchanger is a charge air cooler for cooling an engine turbo charger of the engine upon installation on the vehicle.

16. The cooling package and vehicle combination of claim 15, wherein:

said lower extension of said radiator is between said frame rails.

17. The cooling package and vehicle combination of claim 14, wherein:

said front heat exchanger is a charge air cooler for cooling an engine turbo charger of the engine upon installation on the vehicle; and said rear heat exchanger is a radiator for providing cooling to engine coolant for the engine upon installation on the vehicle.

18. The cooling package and vehicle combination of claim 17, wherein:

said lower extension of said charge air cooler is between said frame rails.

* * * * *